US010735412B2

(12) United States Patent
Alsina et al.

(10) Patent No.: US 10,735,412 B2
(45) Date of Patent: Aug. 4, 2020

(54) USE OF A BIOMETRIC IMAGE FOR AUTHORIZATION

(71) Applicant: Apple Inc., Cupertino, CA (US)

(72) Inventors: Thomas Alsina, Saratoga, CA (US); Farman A. Syed, San Jose, CA (US); Michael K. Chu, Cupertino, CA (US); Cyrus D. Irani, Mountain View, CA (US); Ivan Zadro, London (GB); Sean B. Kelly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 15/979,251

(22) Filed: May 14, 2018

(65) Prior Publication Data

US 2018/0262494 A1 Sep. 13, 2018

Related U.S. Application Data

(63) Continuation of application No. 14/170,360, filed on Jan. 31, 2014, now abandoned.

(51) Int. Cl.

*G06Q 20/40* (2012.01)
*H04L 29/06* (2006.01)

(Continued)

(52) U.S. Cl.

CPC ......... *H04L 63/0861* (2013.01); *G06Q 20/04* (2013.01); *G06Q 20/12* (2013.01);

(Continued)

(58) Field of Classification Search

CPC ................ G06F 21/32; H04L 63/0861; G06Q 20/40145; G06Q 20/4014;

(Continued)

(56) References Cited

U.S. PATENT DOCUMENTS

| | | | |
|---|---|---|---|
| 5,872,834 | A | 2/1999 | Teitelbaum |
| 6,256,737 | B1 | 7/2001 | Bianco et al. |

(Continued)

FOREIGN PATENT DOCUMENTS

| | | |
|---|---|---|
| CN | 1268234 | 9/2000 |
| CN | 1695163 | 11/2005 |

(Continued)

OTHER PUBLICATIONS

Schwartz, Matthew J, "Apple Hackers rate iPhone5s security", Informationweek—online; Monmouth Junction, Sep. 13, 2013, pp. 1-3 (Year: 2013).*

(Continued)

*Primary Examiner* — Mohammad Z Shaikh
(74) *Attorney, Agent, or Firm* — Brownstein Hyatt Farber Schreck, LLP

(57) ABSTRACT

A second user can authorize a first user to take or complete an online action by submitting one or more biometric images. For example, the second user can authorize a purchase by the first user on an online store. The second user can submit the one or more biometric images on the electronic device being used by the first user, or the second user can submit the biometric image or images remotely using another electronic device.

26 Claims, 14 Drawing Sheets

(51) Int. Cl.
*G06Q 30/06* (2012.01)
*G06Q 20/04* (2012.01)
*G06Q 20/32* (2012.01)
*G06Q 20/36* (2012.01)
*G06Q 20/38* (2012.01)
*G06Q 20/12* (2012.01)

(52) U.S. Cl.
CPC ......... *G06Q 20/32* (2013.01); *G06Q 20/3674* (2013.01); *G06Q 20/3821* (2013.01); *G06Q 20/40145* (2013.01); *G06Q 30/0609* (2013.01); *G06Q 30/0637* (2013.01)

(58) Field of Classification Search
CPC ........ G06Q 20/35785; G06Q 20/2295; H04W 12/06; H04W 12/08; H04W 48/02; H04W 12/0608; G07C 9/37; G07C 9/25; G07C 2209/02; G07C 9/26
See application file for complete search history.

(56) References Cited

U.S. PATENT DOCUMENTS 6,400,836 B2 2/2002 Senior
6,795,569 B1 9/2004 Setlak
6,845,453 B2 1/2005 Scheidt et al.
6,892,938 B2 5/2005 Solomon
6,975,202 B1 12/2005 Rodriguez et al.
7,046,139 B2 * 5/2006 Kuhn .................... H04N 7/163 340/3.1
7,065,184 B2 6/2006 Vishik et al.
7,110,987 B2 9/2006 Engelhart
7,210,620 B2 5/2007 Jones
7,246,244 B2 7/2007 Nanavati et al.
7,269,737 B2 9/2007 Robinson
7,278,025 B2 10/2007 Saito et al.
7,373,671 B2 * 5/2008 Gudorf .................. G06F 21/33 235/380
7,502,761 B2 3/2009 Siegal et al.
7,617,399 B2 11/2009 Ebata
7,640,336 B1 * 12/2009 Lu .......................... G06Q 10/10 709/206
7,769,845 B2 8/2010 Baron
7,809,954 B2 10/2010 Miller et al.
7,849,013 B2 12/2010 Engelhart
7,855,899 B2 * 12/2010 Yang ................. H02M 3/33507 323/297
7,864,987 B2 1/2011 Venkatanna et al.
7,865,439 B2 1/2011 Siefert et al.
7,941,664 B2 5/2011 Wheeler
7,953,671 B2 5/2011 Bishop et al.
7,980,378 B2 7/2011 Jones et al.
8,028,896 B2 10/2011 Carter et al.
8,060,413 B2 11/2011 Castell et al.
8,063,889 B2 11/2011 Anderson et al.
8,064,658 B2 11/2011 Iannone
8,065,190 B2 * 11/2011 Collas ................ G06Q 30/0635 705/26.1
8,072,060 B2 12/2011 Chou
8,145,916 B2 3/2012 Boshra et al.
8,171,531 B2 5/2012 Buer
8,185,646 B2 5/2012 Headley
8,190,908 B2 5/2012 Jazayeri et al.
8,219,495 B2 7/2012 Niwa
8,230,232 B2 7/2012 Ahmed et al.
8,320,638 B2 11/2012 Pitt et al.
8,336,096 B2 12/2012 Narusawa et al.
8,345,931 B2 1/2013 Jeronimus
8,346,953 B1 * 1/2013 Hew ....................... H04L 63/10 709/201
8,369,845 B2 2/2013 Zou et al.
8,406,736 B2 3/2013 Das et al.
8,429,760 B2 4/2013 Tribble
8,473,748 B2 6/2013 Sampas
8,483,659 B2 7/2013 Mahajan et al.
8,548,166 B2 10/2013 Wasilewski et al.
8,566,955 B2 10/2013 Brosnan et al.
8,572,707 B2 10/2013 Tuchman et al.
8,621,561 B2 12/2013 Cross et al.
8,621,642 B2 12/2013 Bjorn et al.
8,627,417 B2 1/2014 Aoyama
8,627,454 B2 1/2014 Bolyukh
8,635,165 B2 1/2014 Beenau
8,660,322 B2 2/2014 Tsai et al.
8,682,798 B2 3/2014 Patterson
8,745,490 B2 6/2014 Kim
8,745,716 B2 6/2014 Brudnicki
8,762,276 B2 * 6/2014 Lepisto ............ G06Q 20/40145 705/44
8,799,670 B2 8/2014 Naccache
8,839,371 B2 9/2014 Ghosh
8,905,303 B1 12/2014 Ben Ayed
8,943,326 B2 1/2015 Tamkhane et al.
8,943,580 B2 1/2015 Fadell et al.
8,966,076 B2 2/2015 Kawana et al.
9,037,869 B2 5/2015 Avancha et al.
9,076,027 B2 7/2015 Miura et al.
9,098,510 B2 8/2015 Seryakov et al.
9,119,067 B2 8/2015 Santamaria et al.
9,203,845 B2 12/2015 Webber
9,208,337 B2 12/2015 Tayloe
9,294,550 B2 3/2016 Song et al.
9,390,251 B2 7/2016 Avancha et al.
9,411,037 B2 8/2016 Jamtgaard et al.
9,443,097 B2 9/2016 O'Hare et al.
9,576,135 B1 * 2/2017 Komandoor Elayavilli ................ G06F 21/60
9,665,785 B2 5/2017 Han et al.
9,699,168 B2 7/2017 Pieczul et al.
9,721,086 B2 8/2017 Shear et al.
9,723,482 B2 8/2017 Wang et al.
9,819,676 B2 11/2017 Han et al.
9,832,189 B2 11/2017 Han et al.
9,959,539 B2 5/2018 Han et al.
10,373,241 B2 * 8/2019 Khalsa ............... H04N 21/4227
2002/0018585 A1 2/2002 Kim
2002/0056043 A1 5/2002 Glass
2002/0073416 A1 6/2002 Ramsey Catan
2002/0095586 A1 7/2002 Doyle et al.
2002/0174345 A1 11/2002 Patel
2002/0178367 A1 * 11/2002 Hamid .................... G06F 21/32 713/186
2003/0040339 A1 2/2003 Chang
2003/0046237 A1 3/2003 Uberti
2003/0061111 A1 * 3/2003 Dutta ..................... G06Q 30/02 705/26.1
2003/0156740 A1 8/2003 Siegel et al.
2004/0044627 A1 3/2004 Russell et al.
2005/0116026 A1 6/2005 Burger et al.
2005/0154920 A1 7/2005 Tartaglia et al.
2005/0229006 A1 10/2005 deMoura et al.
2006/0064391 A1 3/2006 Petrov et al.
2006/0173793 A1 * 8/2006 Glass ................... G06Q 20/401 705/75
2006/0202797 A1 9/2006 Theis et al.
2006/0204048 A1 9/2006 Morrison et al.
2006/0234764 A1 10/2006 Gamo et al.
2006/0293891 A1 * 12/2006 Pathuel .................... G07C 9/37 704/246
2006/0293892 A1 * 12/2006 Pathuel ................... G06F 21/32 704/246
2007/0078908 A1 * 4/2007 Rohatgi ................. G06Q 50/20
2007/0198435 A1 * 8/2007 Siegal .................. G06Q 20/382 705/67
2007/0267478 A1 * 11/2007 Turek ..................... G06Q 20/28 235/379
2008/0015948 A1 * 1/2008 Fujimaki ............ G06Q 30/0601 705/51
2008/0016371 A1 1/2008 Jiang et al.
2008/0097925 A1 4/2008 King
2008/0103984 A1 5/2008 Choe et al.
2008/0109871 A1 5/2008 Jacobs

(56) References Cited

U.S. PATENT DOCUMENTS

| | | | |
|---|---|---|---|
| 2008/0140569 A1* | 6/2008 | Handel ............ | G06Q 20/35785 705/44 |
| 2008/0148393 A1 | 6/2008 | Wendt | |
| 2008/0195506 A1 | 8/2008 | Koretz et al. | |
| 2008/0267464 A1 | 10/2008 | Goda | |
| 2009/0240622 A1 | 9/2009 | Zandonadi | |
| 2010/0005509 A1 | 1/2010 | Peckover | |
| 2010/0099383 A1 | 4/2010 | Yamagishi | |
| 2010/0218012 A1 | 8/2010 | Joseph et al. | |
| 2010/0241571 A1 | 9/2010 | McDonald | |
| 2010/0321197 A1 | 12/2010 | Wong et al. | |
| 2011/0035768 A1* | 2/2011 | Ling ....................... | G06F 21/10 725/28 |
| 2011/0082791 A1 | 4/2011 | Baghdasaryan et al. | |
| 2011/0119479 A1 | 5/2011 | Cowie et al. | |
| 2011/0138450 A1* | 6/2011 | Kesanupalli ..... | G06Q 20/40145 726/7 |
| 2011/0166922 A1 | 7/2011 | Fuerstenberg | |
| 2011/0238476 A1 | 9/2011 | Carr et al. | |
| 2011/0291798 A1 | 12/2011 | Schibuk | |
| 2011/0300829 A1 | 12/2011 | Nurmi et al. | |
| 2012/0123841 A1 | 5/2012 | Taveau et al. | |
| 2012/0237908 A1 | 9/2012 | Fitzgerald et al. | |
| 2012/0262399 A1 | 10/2012 | Colley et al. | |
| 2012/0290376 A1* | 11/2012 | Dryer ................. | G06Q 20/3278 705/14.23 |
| 2012/0330769 A1 | 12/2012 | Arceo | |
| 2012/0330784 A1 | 12/2012 | Nahidipour | |
| 2012/0331566 A1 | 12/2012 | Lection et al. | |
| 2013/0067545 A1 | 3/2013 | Hanes | |
| 2013/0124416 A1 | 5/2013 | Pawar et al. | |
| 2013/0159699 A1 | 6/2013 | Torkkel | |
| 2013/0246800 A1 | 9/2013 | Stewart | |
| 2013/0254906 A1 | 9/2013 | Kessler et al. | |
| 2013/0298224 A1 | 11/2013 | Heilpern | |
| 2014/0006795 A1* | 1/2014 | Han ..................... | G06O 20/405 713/186 |
| 2014/0007223 A1 | 1/2014 | Han et al. | |
| 2014/0089261 A1* | 3/2014 | Aissi ................... | G06F 11/1461 707/621 |
| 2014/0129843 A1 | 5/2014 | Shi et al. | |
| 2014/0136419 A1 | 5/2014 | Kiyohara | |
| 2014/0189807 A1 | 7/2014 | Cahill et al. | |
| 2014/0279497 A1* | 9/2014 | Qaim-Maqami ............................ | G06Q 20/3821 705/44 |
| 2014/0279498 A1* | 9/2014 | Qaim-Maqami ............................ | G06Q 20/4014 705/44 |
| 2014/0279516 A1 | 9/2014 | Rellas et al. | |
| 2014/0347479 A1 | 11/2014 | Givon | |
| 2015/0026056 A1* | 1/2015 | Calman .............. | G06Q 20/3223 705/42 |
| 2015/0028996 A1* | 1/2015 | Agrafioti ................. | G06F 21/83 340/5.82 |
| 2015/0073998 A1 | 3/2015 | Alsina et al. | |
| 2015/0074796 A1 | 3/2015 | Meir et al. | |
| 2015/0081552 A1 | 3/2015 | Stewart | |
| 2015/0101007 A1* | 4/2015 | Fujioka ............... | G06F 21/6245 726/1 |
| 2015/0116086 A1* | 4/2015 | Kim ........................ | G06F 21/32 340/5.83 |
| 2015/0186892 A1* | 7/2015 | Zhang ................ | G06Q 20/4016 705/44 |
| 2015/0199687 A1 | 7/2015 | Han et al. | |
| 2015/0220931 A1 | 8/2015 | Alsina et al. | |
| 2015/0294382 A1 | 10/2015 | Alsina et al. | |
| 2015/0304323 A1 | 10/2015 | Alsina et al. | |
| 2015/0379617 A1* | 12/2015 | Khalsa ............... | H04N 21/4751 705/26.82 |
| 2016/0147987 A1* | 5/2016 | Jang ........................ | G06F 21/32 726/19 |
| 2016/0182508 A1 | 6/2016 | Gresham et al. | |
| 2016/0241542 A1 | 8/2016 | Kim et al. | |
| 2016/0248769 A1 | 8/2016 | Han et al. | |
| 2017/0364918 A1 | 12/2017 | Malhotra et al. | |
| 2018/0041506 A1 | 2/2018 | Han et al. | |
| 2018/0109520 A1 | 4/2018 | Han et al. | |

FOREIGN PATENT DOCUMENTS

| | | |
|---|---|---|
| CN | 1783052 | 6/2006 |
| CN | 1983336 | 6/2007 |
| CN | 101075282 | 11/2007 |
| CN | 101256700 | 9/2008 |
| CN | 101261679 | 9/2008 |
| CN | 101827148 | 9/2010 |
| CN | 101933051 | 12/2010 |
| CN | 102088353 | 6/2011 |
| CN | 102609837 | 7/2012 |
| CN | 102867250 | 1/2013 |
| CN | 103037065 | 4/2013 |
| CN | 103220637 | 7/2013 |
| CN | 103221958 | 7/2013 |
| CN | 103268550 | 8/2013 |
| CN | 103269273 | 8/2013 |
| CN | 103295129 | 9/2013 |
| DE | 202005003042 | 11/2006 |
| DE | 102009027682 | 1/2011 |
| DE | 102012202731 | 8/2013 |
| EP | 1857954 | 11/2007 |
| EP | 2226741 | 9/2010 |
| EP | 2114051 | 6/2012 |
| EP | 2533172 A1 | 12/2012 |
| EP | 2597585 | 5/2013 |
| GB | 2447752 | 9/2008 |
| JP | A2010140174 | 6/2010 |
| JP | A2010193110 | 9/2010 |
| JP | A2011192288 | 9/2011 |
| KR | 1020120122181 | 9/2011 |
| TW | I236634 | 7/2005 |
| TW | 200901724 | 1/2009 |
| TW | 200919255 | 5/2009 |
| TW | 201319817 | 5/2013 |
| WO | WO 03/062969 | 7/2003 |
| WO | WO 08/004312 | 1/2008 |
| WO | WO 08/030184 | 3/2008 |
| WO | WO 13/095434 | 6/2013 |

OTHER PUBLICATIONS

Paterson et al., "Efficient Identity-based Signatures Secure in the Standard Model," Information Security Group, Royal Holloway, University of London, Egham, Surrey, ACISP'06 Proceedings of the 11th Australasian Conference on Information Security and Privacy, Melbourne, Australia, Jul. 3-5, 2006, 17 pages.

Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.

Spencer et al., "iCaughtU Pro review [iPhone]," Publisher: knowyourmobile.com, Dec. 13, 2011, pp. 1-3.

POT, "What is Apple's 'Secure Enclave," and How Does It Protect My iPhone or Mac? How-to-Geek, Oct. 23, 2018, https://www.howtogeek.com/339705/what-is-apples-secure-enclave-and-how-does-it-protect-my-iphone-or-mac/, 5 pages.

SOAP Web Service Development, Snell, China Electric Power Press, Sep. 2002, pp. 76-81.

* cited by examiner

USE OF A BIOMETRIC IMAGE FOR AUTHORIZATION

CROSS-REFERENCE TO RELATED APPLICATION

This application is a continuation of U.S. patent application Ser. No. 14/170,360, filed Jan. 31, 2014, and entitled "Use of a Biometric Image for Authorization," which is incorporated by reference in its entirety as if fully disclosed herein.

TECHNICAL FIELD

The present invention relates to electronic devices, and more particularly to a biometric sensing device included in, or connected to an electronic device. Still more particularly, the present invention relates to the use of one or more biometric images to authorize or permit an action or task.

BACKGROUND

Passwords are a common security tool for applications, websites, and devices. A user-entered password must match a reference password before the user is given access or allowed to interact with an application, website, or device. But passwords can have a number of limitations. The number of characters that can be included in the password can be limited to a maximum number, such as eight or twelve characters. Additionally, a user can be prohibited from using certain types of characters in their password. For example, some passwords may not include symbols such as a pound or hash symbol (#), an exclamation sign (!), and a percent sign (%). Randomly generated passwords can be more secure than passwords selected by a user, but randomly generated passwords can be difficult to remember. Some users therefore select less secure passwords that are easier to remember. For example, a password that includes a complete word, the user's birthday, or a company name may be easier to remember but such passwords can be easier to guess or discover.

The use of biometric data can provide a greater level of security to a device or application compared to passwords. Biometric sensing devices can detect or image a unique physical or behavioral trait of a person and produce biometric data that can reliably identify the person. For example, a fingerprint includes a unique pattern of ridges and valleys that can be imaged by a fingerprint sensing device. The image of the fingerprint, or the unique characteristics of the fingerprint, is compared to previously captured reference data, such as a reference fingerprint image. The identity of the person is obtained or verified when the newly captured fingerprint image matches the reference fingerprint image.

SUMMARY

In one aspect, a method for a first user to complete a purchase on an online store can include receiving a first biometric image from a second user and countersigning an online account token that is associated with an account of the first user on the online store. The account token can be countersigned with user identifier data. The account token can be countersigned when the first biometric image received from the second user matches a first reference biometric image associated with the second user. The countersigned online account token indicates the purchase on the online store can be completed. The countersigned account token can then be transmitted to the online store. In some embodiments, the user identifier data may include a universally unique identifier that is associated with the first biometric image, a directory services identification (DSID) that represents an account of the first user on the online store, and/or a universally unique identifier that is associated with the second biometric image. In one embodiment, authorization is needed when the purchase amount exceeds a specified monetary limit. In another embodiment, the authorization can also authorize the first user to spend a specified amount of money.

In another aspect, a system can include a processing device and a biometric sensing device operatively connected to the processing device. The processing device can be adapted to determine if authorization from a second user is needed before a first user can complete a purchase on an online store. The processing device can be adapted to countersign an account token when a first biometric image received from the second user matches a first reference biometric image associated with the second user, where the countersigned online account token indicates the purchase on the online store can be completed. The first biometric image can be obtained from the second user using the same electronic device as first user is using to submit the purchase. Alternatively, the first biometric image can be obtained remotely from the second user using a different electronic device. The countersigned account token can then be transmitted to the online store.

In another aspect, a method for a first user to complete a purchase on an online store may include receiving a first biometric image from the first user and determining if the purchase by the first user requires authorization from a second user. If authorization is needed, a notification can be provided to the second user. A second biometric image can be received from the second user based on the notification. An online account token that is associated with an account of the first user on the online store can be countersigned with user identifier data when an identity of the first user and/or an identity of the second user is confirmed based on the first and second biometric images, where the countersigned online account token indicates the purchase on the online store can be completed. In some embodiments, the notification can include an identity of the online store, a monetary amount of the purchase on the online store, an input that permits the second user to limit an amount of money the first user can spend in the purchase, and/or an input that permits the second user to limit an amount of time the first user can spend on the online store.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
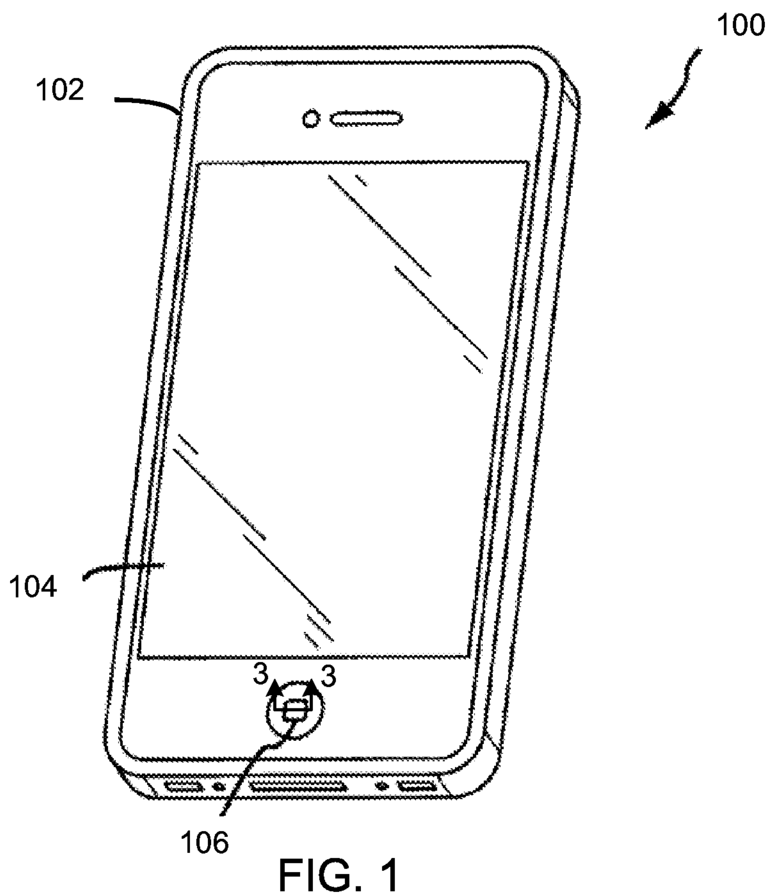
FIG. 1 is a perspective view of an example electronic device that can include a fingerprint sensing device.

Embodiments described herein can permit a second user to authorize a first user to take or complete an action through the use of biometric data. As one example, a second user can authorize a first user to complete a purchase on an online store. The authorization can also permit the user to spend a given amount of money in one or more transactions and/or over a prescribed period of time. The first user can submit one or more biometric images to initiate the purchase, and the online store can transmit an online account token to an electronic device and/or to a biometric sensing device after the user successfully enters his or her account password. The electronic device or the biometric sensing device can countersign the online account token when the one or more biometric images match reference biometric images and the account password matches user identifier data stored in the electronic device or in the biometric sensing device. The countersigned online account token can then be transmitted to the online store.

The second user can be required to submit his or her biometric image to authorize the purchase on the online store. In some embodiments, the biometric image must be received from the second user within a specified period of time after the first user submits his or her purchase request. In one embodiment, a countersigned online account token can be transmitted to the online store after the biometric image is received from the second user and the identity of the second user is verified. The first user may then be allowed to complete one or more purchases after the online store receives the countersigned online account token.

In some embodiments, the second user can provide authorization remotely. For example, a first user can initiate an action that requires authorization on a first device. A notification regarding the need for authorization can be provided to the first user on the first device and to the second user on a second device. The second user can submit one or more biometric images on the second device as part of the authorization process. If the identity of the second user is authenticated using the one or more biometric images, the first user may be allowed to complete the action on the first device.

In some embodiments, an owner of an electronic device can establish or enable a guest mode in the electronic device. Guest mode can permit a guest user to access certain functions and applications when the guest user is temporarily using the electronic device. For example, a person (i.e., guest user) can ask to use a friend's smart telephone to make a call, send a text, or check a website or email. When the device owner has enabled the guest mode, the guest user can access some, but not all of the functions and applications in the electronic device. An electronic device owner can specify which applications and functions a guest user can access and/or may specify the maximum amount of time the guest user has to use the electronic device.

In some embodiments, an owner of an electronic device can create a user profile. A user profile is similar to the guest mode, but can provide the guest user with access to a greater number of functions and applications, and/or can allow the device owner to customize the applications and functions accessible by each guest user. For example, a guest user A may be allowed to send text messages and access the web to view websites while a guest user B can access the web to view websites and make purchases on online stores, make telephone calls (when the electronic device is a smart telephone), and take photos. The ability to view photos, modify a Wi-Fi connection, activate airplane mode, set the alarm clock, and read texts and emails can be denied to one or both guest users.

Any suitable type of biometric sensing device can be included in, or connected to an electronic device. A person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute" is meant to encompass a physical or behavioral trait that can be detected by a biometric sensing device.

Referring now to FIG. 1, there is shown a perspective view of one example of an electronic device that can include, or be connected to a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable computing device or display such as a watch or glasses, and other types of electronic devices that can receive biometric data from a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

Figure 2:
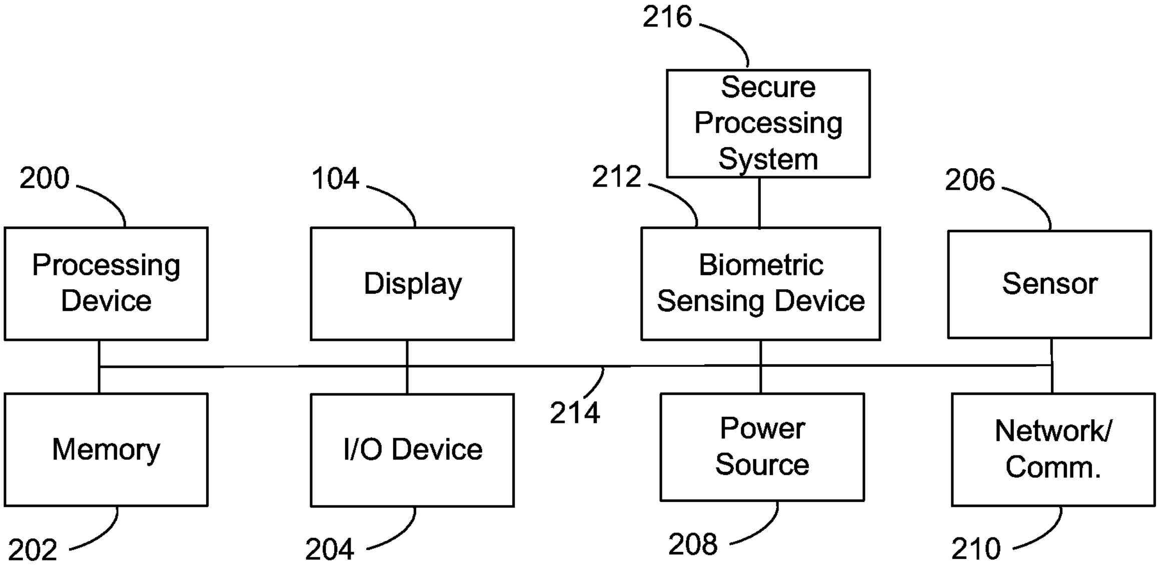
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric sensing device 212. The display 104 may display an image or video output for the electronic device 100. The display may also provide an input region for one or more input devices, such as, for example, a touch sensing device and/or a fingerprint sensing device. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 206 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can be implemented as any suitable biometric sensor, scanner, and/or system. For example, the biometric sensing device can be a facial recognition device, an iris or retina scanner, a vein recognition device that can image the veins in a finger or palm, a facial biometrics scanner, and/or a thermal imaging scanner. Additionally, the biometric sensing device 212 can be implemented with any suitable sensing technology, including, but not limited to, capacitive, resistive, ultrasound, piezoelectric, and thermal sensing technology. A biometric sensing device can capture one or more biometric images of a biometric attribute.

The biometric sensing device 212 can be connected to a secure processing system 216. The secure processing system can be included in the electronic device or in the biometric sensing device. The secure processing system 216 can receive biometric images captured by the biometric sensing device. The secure processing system 216 generally can be used to store and manipulate secure data, including the biometric images, reference biometric images, and user identifier data associated with a user and his or her online account for an online store. The processing device 200 can be prohibited from accessing the secure data and the biometric images received from the biometric sensing device, which increases the security of the data and biometric images. For example, the secure data and biometric images are inaccessible or less accessible to other programs that may be running on the processing device 200.

In one embodiment, the secure processing system can include a secure processing device, a secure persistent memory, and a secure non-persistent memory. Any suitable processing device and memory can be used in the secure processing system 216. Other components can be included in the secure processing system in some embodiments. Additionally or alternatively, a secure processing system can include only one memory. The secure processing system 216 is described in more detail in conjunction with FIGS. 5, 7 and 10.

It should be noted that FIGS. 1 and 2 are illustrative only. In other examples, an electronic device may include fewer or more components than those shown in FIGS. 1 and 2.

In embodiments described herein, the biometric sensing device includes one or more fingerprint sensing devices. A fingerprint sensing device can capture images one or more fingers, a portion of one or more fingers, and/or some or all of a palm or of a hand. In some embodiments, the fingerprint sensing device is positioned at a location that a user's finger, fingers and/or hands are naturally in contact with as the user interacts with the electronic device. For example, an electronic device can include a fingerprint sensing device in the display 104, the button 106, the enclosure 102, and/or as a separate electronic device that is connected to the electronic device 100.

Figure 3:
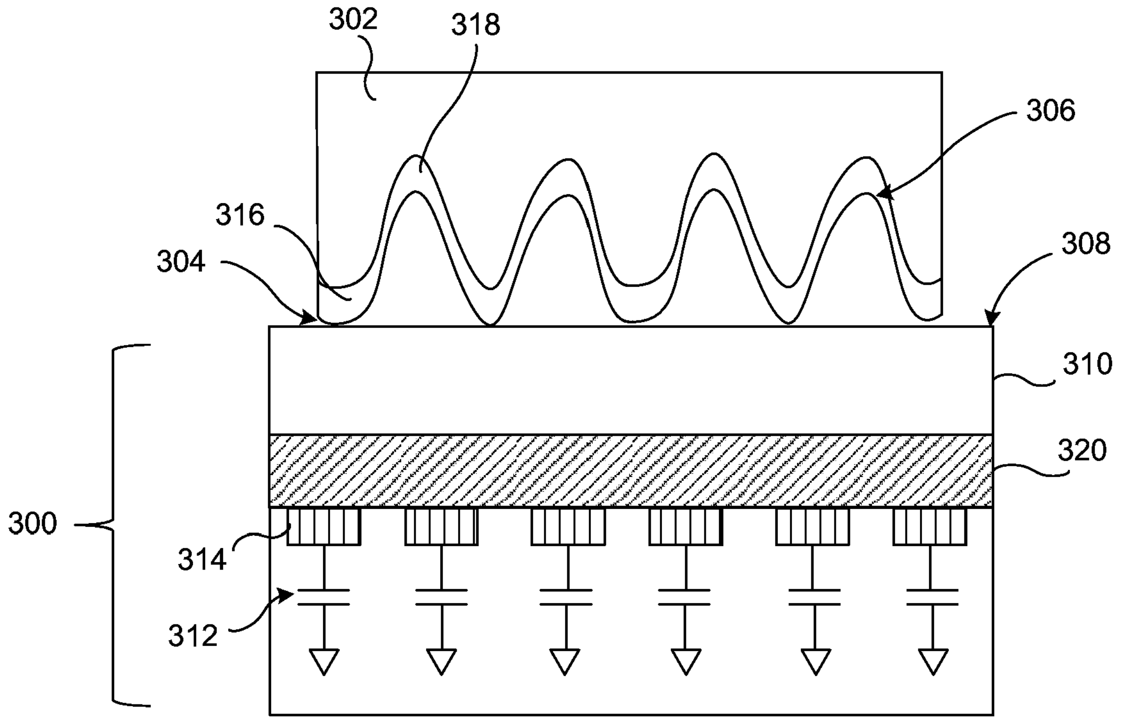
FIG. 3 depicts an enlarged and simplified cross-section view of a portion of a fingerprint sensing device taken along line 3-3 in FIG. 1.

The construction of an illustrative capacitive fingerprint sensing device and the operation of the capacitive fingerprint sensing device will now be described briefly. FIG. 3 illustrates an enlarged and simplified cross-section view of a portion of a fingerprint sensing device taken along line 3-3 in FIG. 1. A first layer 310 can be disposed over a dielectric layer 320. By way of example only, the first layer 310 can be a dielectric layer such as an exterior surface of a button or other input device (e.g., button 106 in FIG. 1), an exterior surface of an input device such as a trackpad or mouse, and/or a cover glass of a display (e.g., display 104 in FIG. 1). In some embodiments, the dielectric layer 320 can be a color layer that can be used to reduce the visibility of the electrodes and other circuitry of the fingerprint sensing device.

The capacitive fingerprint sensing device 300 can capture a fingerprint image of at least a portion of the finger 302 by measuring capacitance differences between the finger 302 and the electrodes 314. A fingerprint is generally formed from ridges 304 and valleys 306 arranged in a unique pattern. Typically, the capacitance measured between a ridge 304 and one or more electrodes 314 varies from the capacitance measured between a valley 306 and one or more electrodes 314. The measured capacitance between a ridge and an electrode can be greater than the measured capacitance between a valley and an electrode because the ridge is closer to the electrode. The differences in the measured capacitances can be used to distinguish between ridges and valleys and produce a fingerprint image.

The skin on the finger 302 includes a dead skin layer 316 disposed over a live skin layer 318. The capacitive fingerprint sensing device 300 typically images the dead skin layer 316 to obtain an image of the fingerprint. However, if a portion of the dead skin layer 316 is damaged or missing, the capacitive fingerprint sensing device can obtain an image of the fingerprint by imaging the live skin layer 318 by itself, or by imaging both the remaining dead skin layer 316 and the exposed live skin layer 318.

Figure 4:
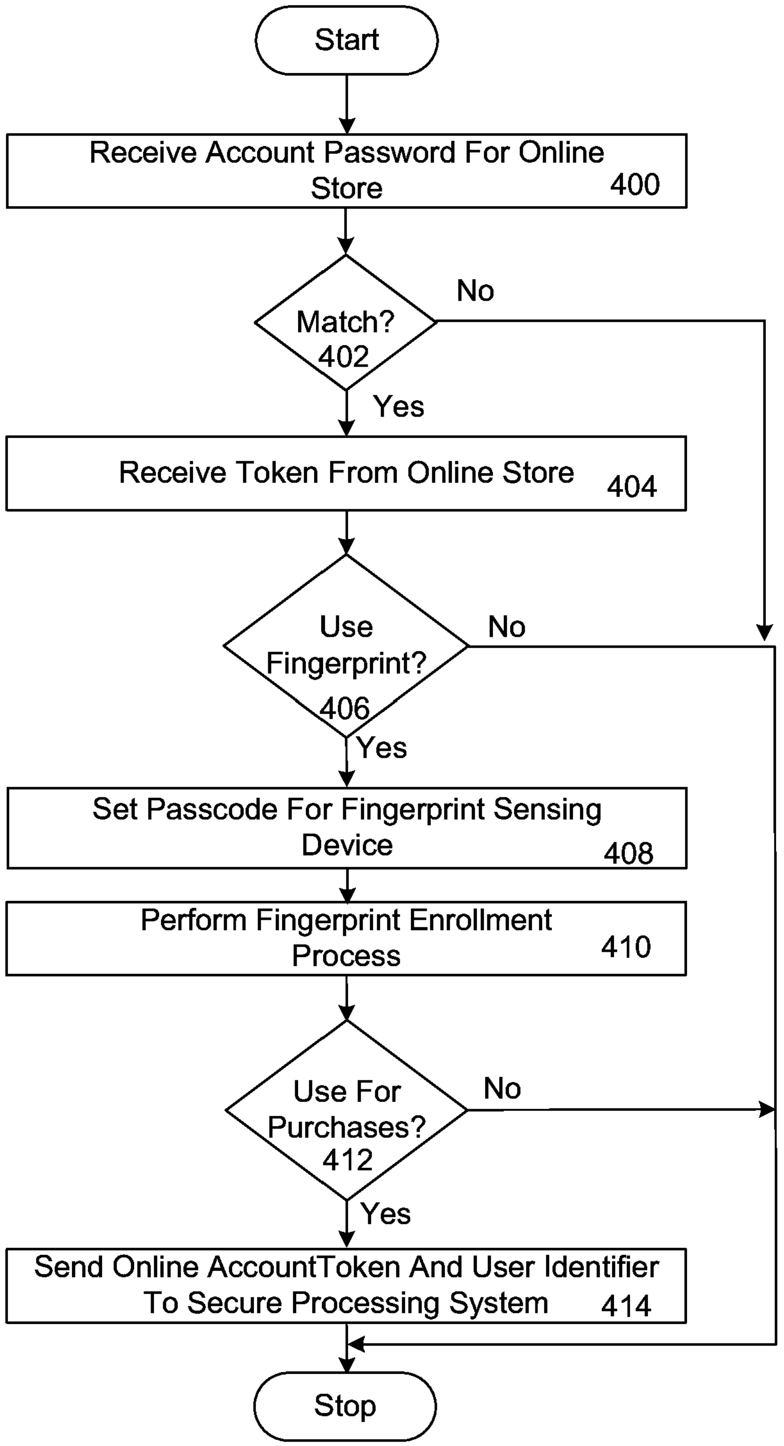
FIG. 4; is a flowchart of a method for setting up a biometric sensing device for use in online commerce.
Figure 5:
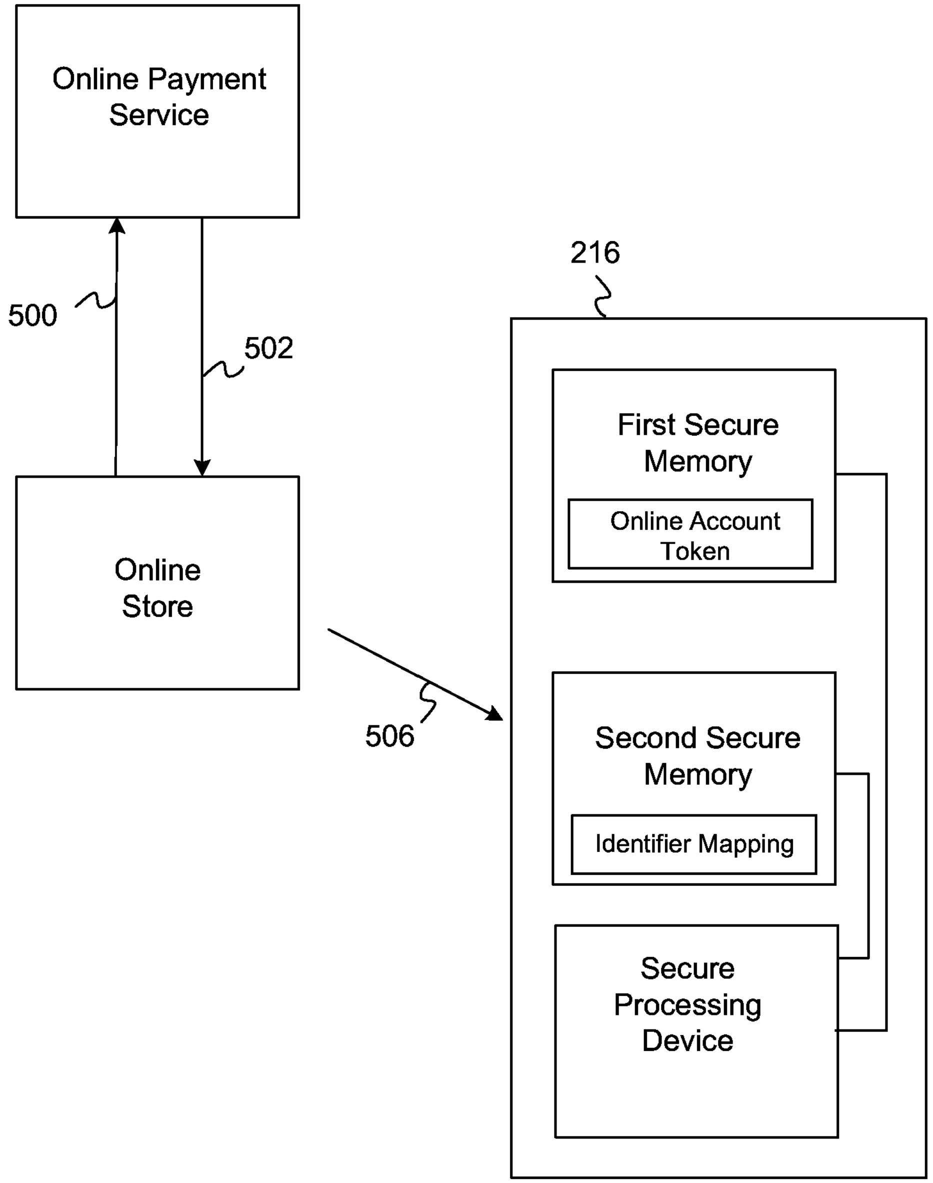
FIG. 5 is a data flow diagram of the method shown in FIG. 4.

Embodiments described herein can permit a second user to authorize a first user to take or complete an action. As one example, a second user can authorize a first user to complete a purchase on an online store. FIG. 4 is a flowchart of a method for setting up a fingerprint sensing device for use in online commerce. FIG. 5 is a data flow diagram of the method shown in FIG. 4. Initially, an account password is received after being entered on an electronic device by a user (block 400). The account password can be associated with an online store in one embodiment. The account password can be entered through a dialog box in a user interface. In one embodiment, the account password can be transmitted to an online payment service to match with an account in the online store (see step 500 in FIG. 5). The online store and the online payment service can each be implemented on one or more computing devices, such as servers. A determination can then be made at block 402 as to whether the entered account password matches the password associated with the online account. If not, the method ends.

When the entered account password matches the account password, the process continues at block 404 where an online account token is received from the online payment service (step 502 in FIG. 5). A determination can then be made at block 406 as to whether the fingerprint sensing device is to be used with the online store. As one example, a user can be prompted to approve or reject the use of the fingerprint sensing device with a dialog box or menu. The method ends if the user does not use the fingerprint sensing device in conjunction with online commerce.

When the fingerprint sensing device is to be used, the method continues at block 408 where a user can set a passcode for the fingerprint sensing device. A fingerprint enrollment process can then be performed with the fingerprint sensing device at block 410. Generally, an enrollment process can include capturing one or more fingerprint images and storing at least one of the fingerprint images in memory. At least one of the fingerprint images entered during the enrollment process can be used as a reference fingerprint image.

A determination can then be made at block 412 as to whether or not the fingerprint sensing device is to be used for purchases from the online store. As one example, a user can be prompted to approve or reject the use of the fingerprint sensing device with a dialog box or menu. The method ends if the fingerprint sensing device will not be used to make purchases on the online store.

When the fingerprint sensing device will be used to make purchases, the process passes to block 414 where the online account token and user identifier data are transmitted to a secure processing system (e.g., 216 in FIG. 2) in the electronic device (step 506 in FIG. 5). In one embodiment, the user identifier data can associate or map the passcode for the fingerprint sensing device to the online store account. The user identifier data can include the passcode set at block 408, a universally unique identifier (UUID) associated with the fingerprint sensing device, and a data set identification (DSID) associated with the online store. In some embodiments, a hash of the DSID is included in the user identifier data instead of the DSID. Other types of user identifier data can be used in other embodiments.

In some embodiments, the secure processing system 216 can include a non-persistent secure memory and a persistent secure memory. The online account token can be transmitted to the secure processing system 216 and stored in the non-persistent secure memory. Thus, the online account token may be cleared automatically from the non-persistent secure memory each time the non-persistent memory loses power, such as when the electronic device is turned off. The user identifier data can be transmitted to the secure processing system 216 and stored in the persistent secure memory. Additionally, reference fingerprint images can be stored in the persistent secure memory in some embodiments.

Figure 6:
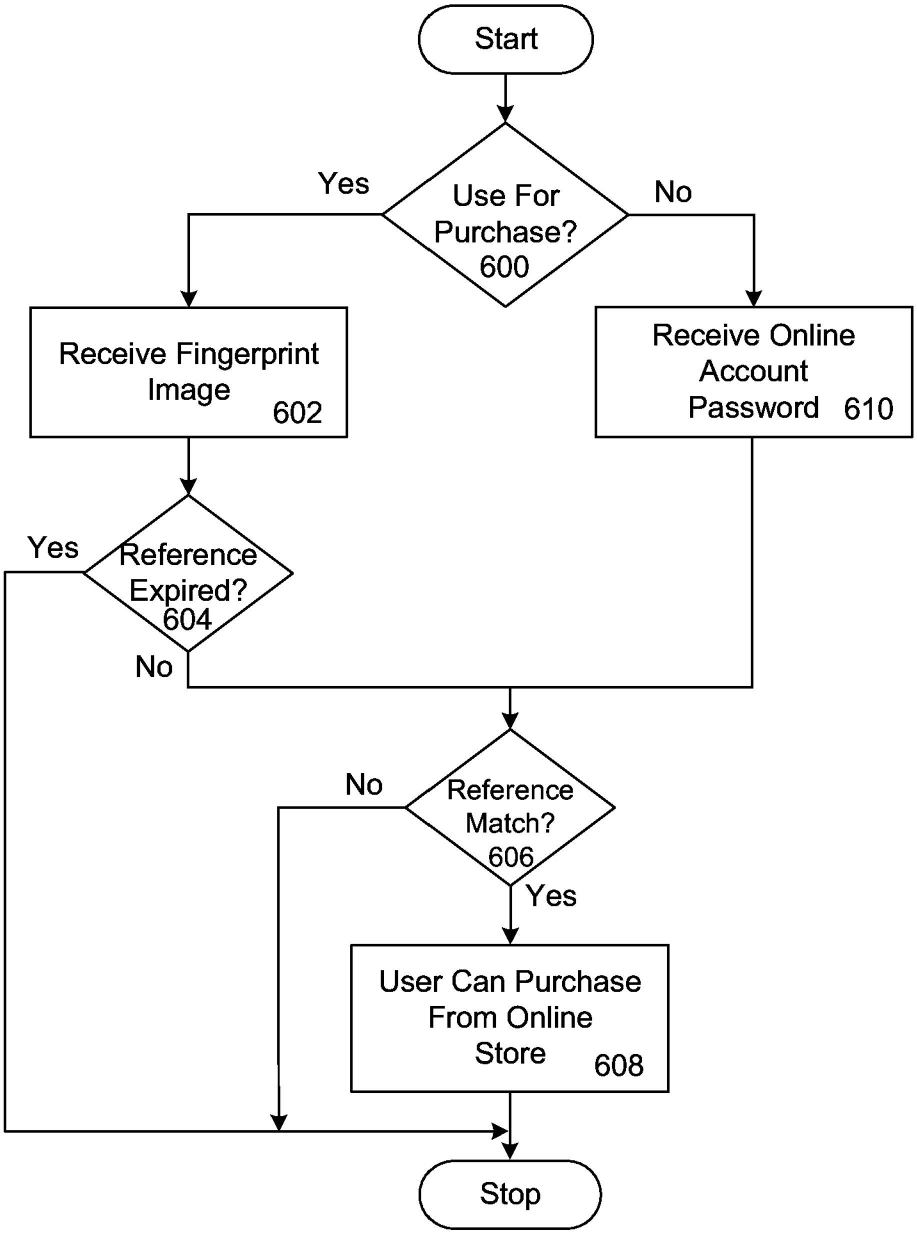
FIG. 6 is a flowchart of a method for a first user to purchase from an online store.
Figure 7:
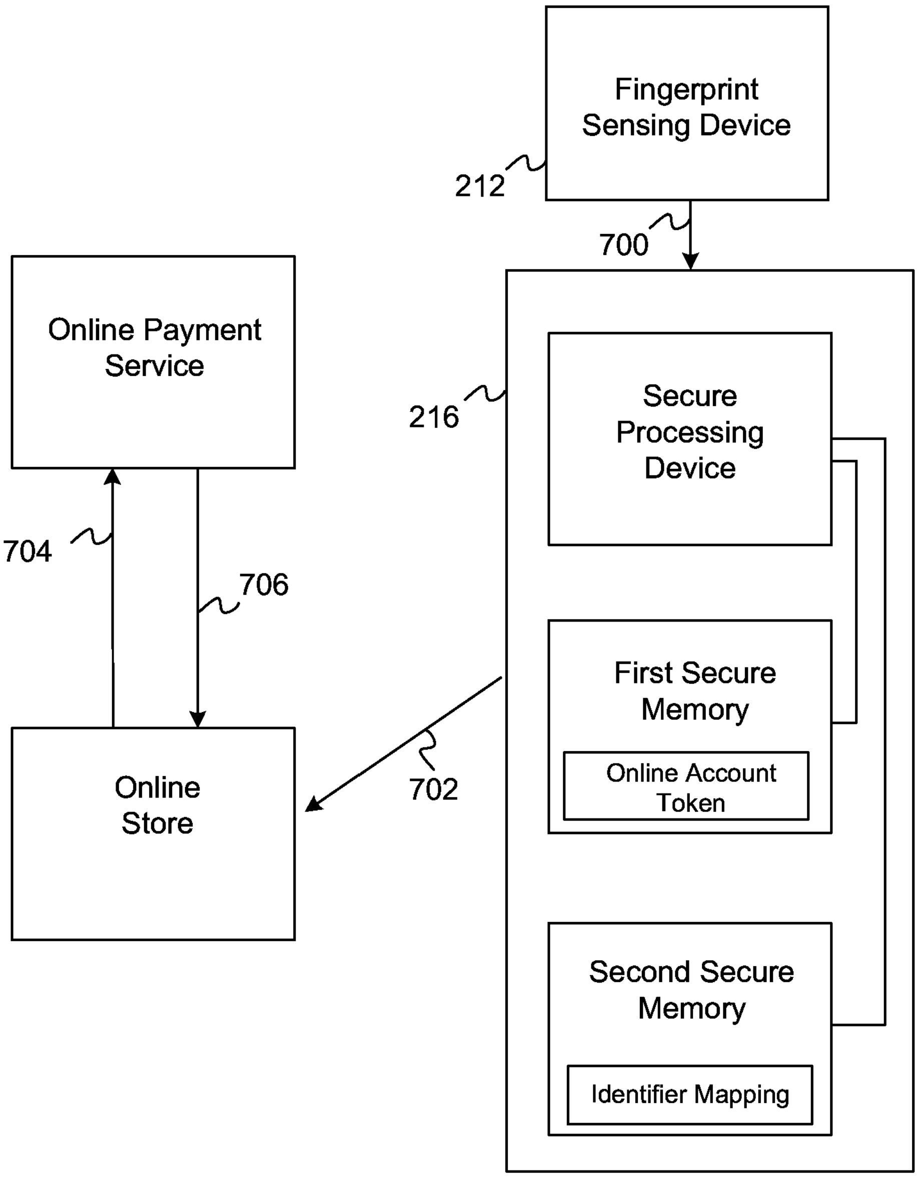
FIG. 7 is a data flow diagram of the method shown in FIG. 6.

Referring now to FIG. 6, there is shown a flowchart of a method for a first user to purchase from an online store. FIG. 7 is a data flow diagram of the method shown in FIG. 6. Initially, as shown in block 600, a determination can be made as to whether the fingerprint sensing device is to be used to complete a purchase from the online store (block 600). If so, the process continues at block 602 where a fingerprint image can be captured and transmitted to a processing system (step 700 in FIG. 7). The processing system can be a secure processing system in some embodiments. A determination can then be made at block 604 as to whether the reference fingerprint image has expired. In some embodiments, a user can set an expiration date for his or her reference fingerprint image. The user can allow the reference fingerprint image or images to be used only for a set period of time. After the reference fingerprint image expires, a user can perform another enrollment process to create another reference fingerprint image.

The method ends if the reference fingerprint image has expired. When the reference fingerprint image has not expired, the method passes to block 606 where a determination is made as to whether the fingerprint image received at block 602 matches the reference fingerprint image. The method ends if the entered fingerprint image does not match the reference fingerprint image. When the fingerprint image matches the reference fingerprint image, the process continues at block 608 where a user can now complete the purchase on the online store. A purchase can be completed by having a processing device (e.g., secure processing device) countersign the online account token stored in the first secure memory and transmit the countersigned online account token to the online store. The countersigned online account token can indicate the fingerprint image matched the reference fingerprint image. The countersigned online account token can indicate the user is permitted to make one or more purchases on the online store.

In one embodiment, the secure processing device can countersign the online account token with the hash of the DSID and transmit the countersigned online account token to the online store (step 702 in FIG. 7). The online store can then transmit the countersigned online account token to the online payment service (step 704). The online payment service can verify the online account token is countersigned, complete payment for the purchase, and then transmit a purchase confirmation notification to the online store (step 706). The secure processing device can countersign and transmit the online account token immediately after the fingerprint image matches the reference fingerprint image. Alternatively, the online account token can be countersigned in advance but not transmitted to the online store until after the fingerprint image matches the reference fingerprint image.

In some embodiments, a window of time can be set in which a user can make purchases repeatedly without having to reenter a fingerprint image. The online account token can include a timestamp that indicates a start time for the window. As one example, when the fingerprint image matches the reference fingerprint image at block 606, a fifteen minute window can be created where a user can make multiple purchases. The window can then close after fifteen minutes and the user will have to re-enter his or her fingerprint image to complete any other purchases.

In some embodiments, the ability of a first user to complete a purchase can be constrained in some manner and authorization from a second user required to complete the purchase. For example, a first user can be limited in the amount of money he or she can spend, and/or a user can be limited in the online stores he or she can purchase from and/or in the type of content or product he or she can purchase. As one example, a parent can limit the amount of money a child can spend in each purchase, and/or a parent can limit a total amount of money a child may spend in a given period of time. As another example, a parent can limit purchases to only pre-approved online stores. Additionally or alternatively, a parent can control the type of content or products a child can purchase from an online store. The restrictions and/or approvals can be made via a preferences menu associated with an online account on the online store, and/or through a preferences menu associated with the fingerprint sensing device.

When a restricted first user initiates a purchase on an online store, a second user can be required to submit his or her fingerprint image to authorize the purchase. The second user can be designated as a second user who can authorize the purchases of the restricted first user through the preferences menu for the online account and/or the preferences menu for the fingerprint sensing device. In some embodiments, the fingerprint image must be received from the second user within a specified period of time. A countersigned online account token can be transmitted to the online store after the fingerprint image is received from the second user and the identity of the second user is verified. The first user can then complete one or more purchases after the online store receives the countersigned online account token.

Figure 8:
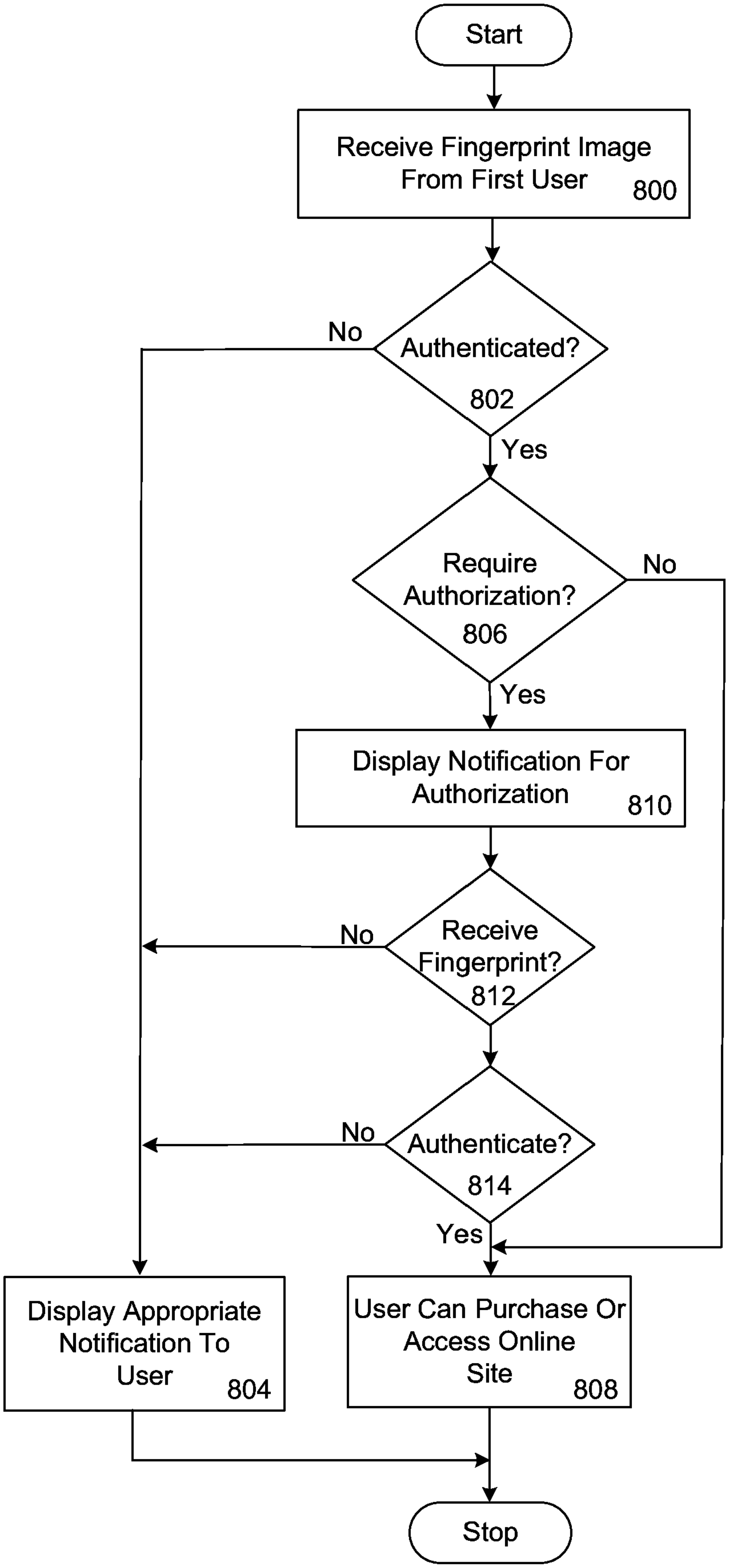
FIG. 8 is a flowchart of a method for a second user to authorize a first user to complete an action.

FIG. 8 is a flowchart of a method for a second user to authorize a first user to complete an action. In some embodiments, one or more fingerprint images can be received in conjunction with an action the first user wants to perform or complete online. For example, the first user may want to complete a purchase from an online store and/or may want to access a website or application (e.g., part of a sign-in or login process for the website or application).

Initially, as shown in block 800, a fingerprint image is received from the first user. The fingerprint image can be received by a processing device, such as a secure processing device. A determination can then be made as to whether or not the identity of the first user is authenticated using the fingerprint image. If not, the process passes to block 804 where an appropriate notification is provided to the first user. As one example, a notification regarding the failed authentication (e.g., a failed match) can be displayed to the first user. The method can then end after the notification is provided to the first user.

When the identity of the first user is authenticated, the method continues at block 806 where a determination can be made as to whether or not the action the first user is attempting to take or complete requires authorization from a second user. If authorization is not needed from a second user, the method passes to block 808 where the first user can complete the desired action. For example, the first user can complete a purchase or access an online store or application.

When authorization is needed from a second user, the method continues at block 810 where a notification can be provided to the first user and/or the second user regarding the need to obtain authorization from the second user. In one embodiment, the notification can be displayed to the first user and/or the second user. In another embodiment, the notification can be provided via a visual (e.g., text message) or audio alert. A determination can then be made at block 812 as to whether or not a fingerprint image is received from the second user. In some embodiments, the authorization fails if the fingerprint image is not received within a given time period.

When a fingerprint image is not received, the process passes to block 804 where an appropriate notification can be provided to the first user, and to the second user if desired. When a fingerprint image is obtained from the second user, the method can continue at block 814 where a determination is made as to whether or not the identity of the second user is authenticated based on the fingerprint image. If not, the process passes to block 804. When the identity of the second user is authenticated, the first user can complete the action at block 808 and the method ends.

Figure 9A:
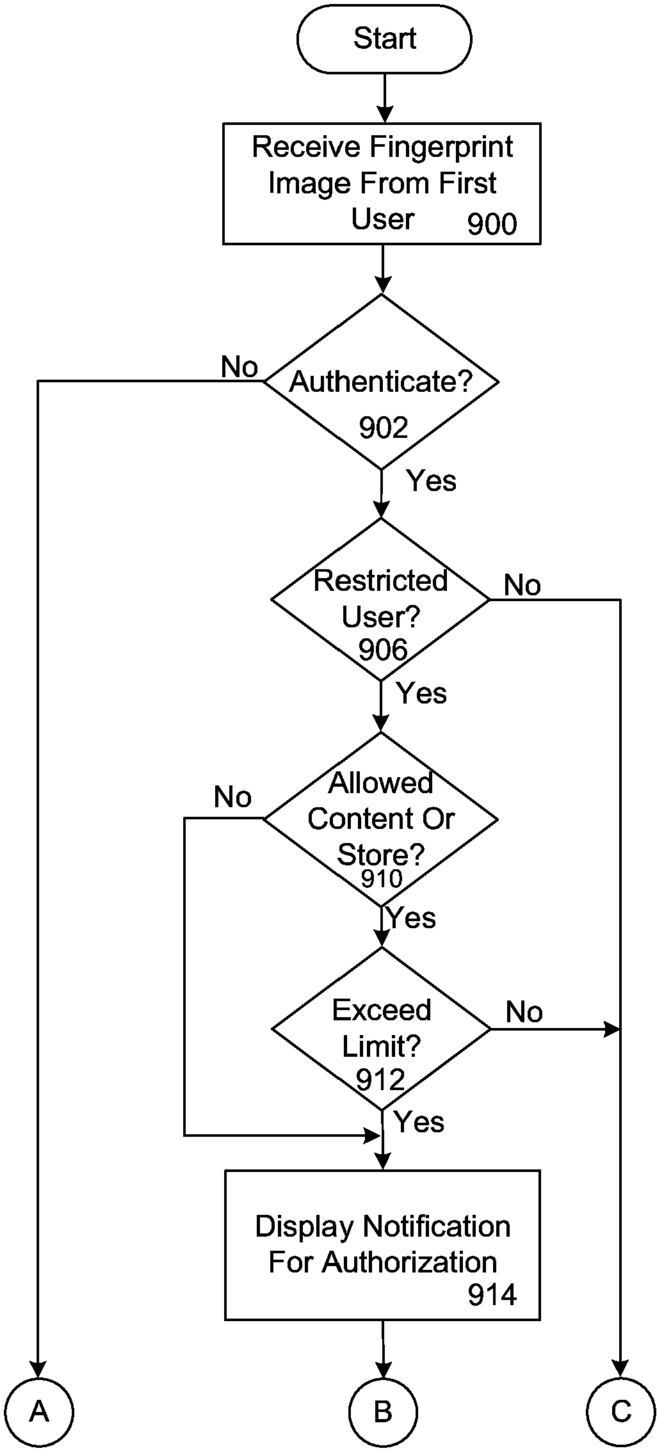
FIGS. 9A-9B is a flowchart of a method for a second user to authorize a first user to complete an action.
Figure 9B:
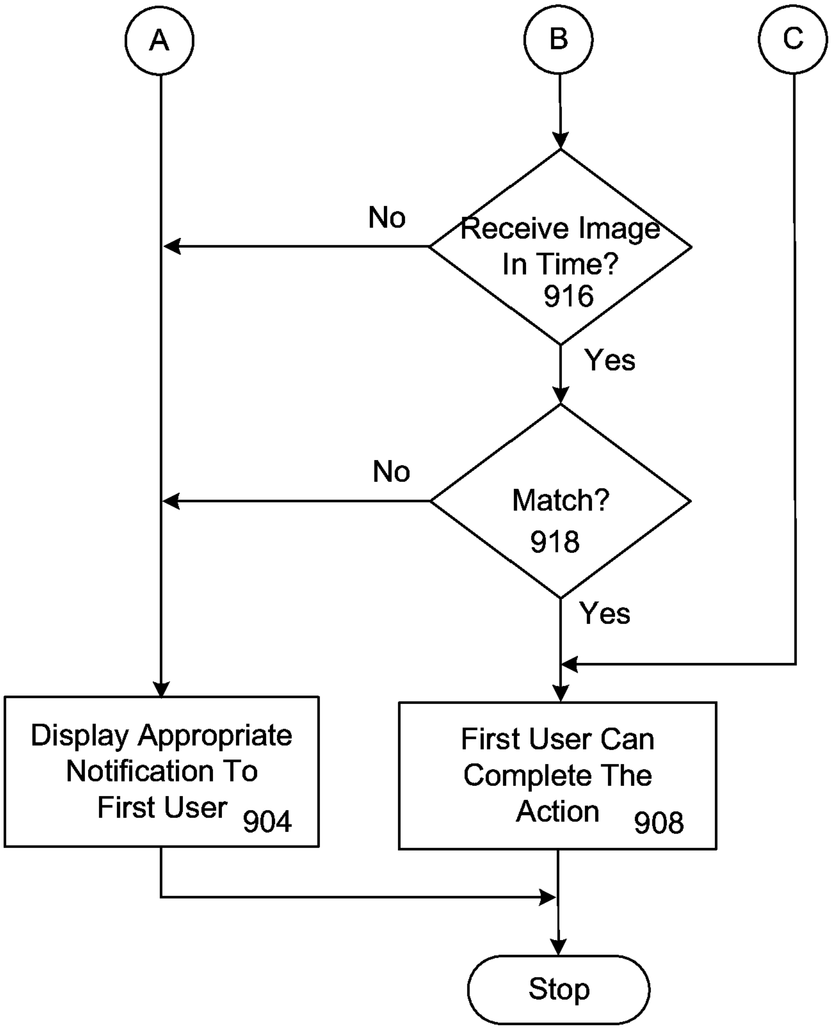
Figure 10:
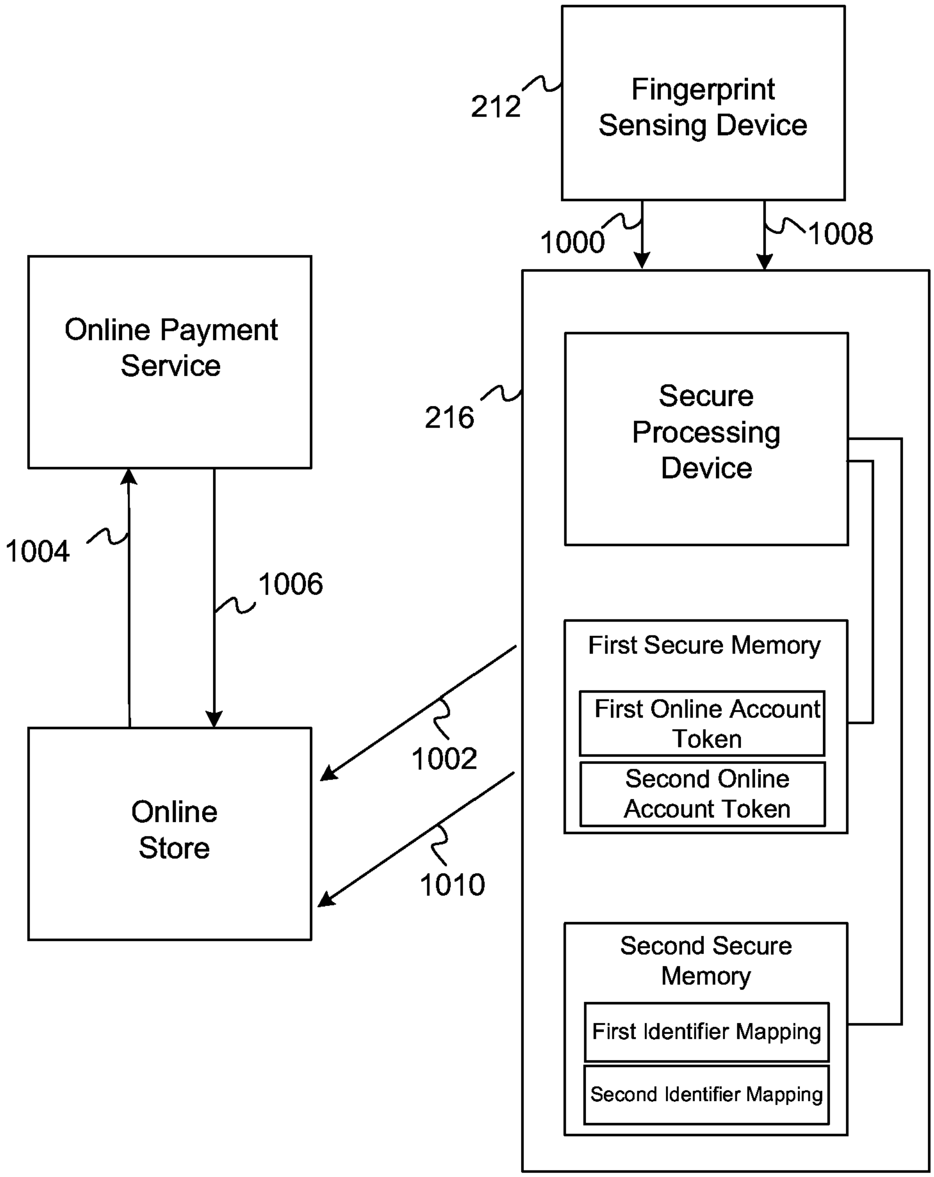
FIG. 10 is a data flow diagram of the method shown in FIG. 9.

Referring now to FIGS. 9A-9B, there is shown a flowchart of another method for a second user to authorize a first user to complete an action. FIG. 10 is a data flow diagram of the method shown in FIG. 9. The illustrated embodiment requires a fingerprint image be received from a second user to authorize a purchase that meets or exceeds a maximum amount. Additionally or alternatively, other embodiments can require a fingerprint image be received from a second user to authorize a purchase when the online store is not a pre-approved online store, or the purchase is for non-approved content.

Initially, a first fingerprint image can be received by a processing device at block 900 (step 1000 in FIG. 10). In some embodiments, the processing device is a secure processing device. The first fingerprint image can be entered by a first user when the first user wants to complete a purchase on the online store. A determination can then be made at block 902 as to whether the first fingerprint image matches a first reference fingerprint image for the first user. If not, the process passes to block 904 where an appropriate notification can be provided to the first user. As one example, a notification regarding the failed match can be displayed to the first user and, if desired, to the second user. The method can then end after the notification is provided to the first user.

When the first fingerprint image matches the first reference fingerprint image, the method continues at block 906 where a determination is made as to whether the first user is a restricted user. By way of example only, a first online account token can indicate if the first user is a restricted user and the types of restrictions. If the first user is not a restricted user, the process passes to block 908 where the first user can complete the desired action. For example, the first user can purchase from the online store and/or access content or applications. In some embodiments, a purchase can be completed by having a processing device countersign the first online account token and transmit the countersigned online account token to the online store. The countersigned online account token can indicate the user is permitted to make one or more purchases on the online store. The method can end after block 908.

As described earlier, in one embodiment a secure processing device can countersign the first online account token associated with the first user with a hash of the DSID associated with the online store and transmit the countersigned first online account token to the online store (step 1002 in FIG. 10). The online store can then transmit the countersigned online account token to the online payment service (step 1004). The online payment service can verify the online account token is countersigned, complete payment for the purchase, and then transmit a purchase confirmation notification to the online store (step 1006). Like the embodiment shown in FIG. 6, the secure processing device can countersign and transmit the online account token immediately after the biometric image matches the reference biometric image. Alternatively, the online account token can be countersigned in advance but not transmitted to the online store until after the biometric image matches the reference biometric image.

When the first user is a restricted user at block 906, the method continues at block 910 where a determination is made as to whether the first user is purchasing from a permitted online store or is purchasing allowed content. As described earlier, a restricted user can be limited to purchasing only from select pre-approved online stores and/or approved content. If the first user is purchasing from a permitted online store or purchasing approved content, the method continues at block 912 where a determination can be made as to whether or not the amount of the purchase equals or exceeds a predetermined maximum amount of money. The predetermined maximum amount of money can apply to a single purchase in some embodiments. In other embodiments, the maximum amount can apply to a total amount of all purchases made within a specific time period. As one example, a user can be limited to a total amount of twenty dollars within a twenty-four hour period of time.

If the amount of the purchase does not equal or exceed the maximum amount, the process passes to block 908 where the first user can complete the purchase on the online store. The purchase can be completed by having a processing device transmit a countersigned online account token associated with the first user to the online store. The countersigned online account token can indicate the user is permitted to make one or more purchases on the online store. In one embodiment, the purchase can be completed as described previously with reference to block 908.

When the purchase amount equals or exceeds the predetermined maximum limit, or if the first user is attempting to purchase from a non-approved online store or trying to purchase non-approved content at block 910, the method continues at block 914 where a notification is displayed to the first user informing the first user of the need to obtain authorization for the purchase based on the purchase amount or purchase site and/or content. In one embodiment, the authorization can be provided by a second user specified in the first online account token associated with the first user.

In the illustrated embodiment, the second user can provide authorization by submitting his or her fingerprint image (step 1008 in FIG. 10). A determination can be made at block 916 as to whether the second fingerprint image is received within a given time period. If not, the process passes to block 904 where an appropriate notification is provided to the first user or to the first and second users.

When the second fingerprint image associated with the second user is received within the given time period, the method continues at block 918 where a determination is made as to whether the second fingerprint image received at block 916 matches a second reference fingerprint image associated with the second user. If not, the process passes to block 904 where an appropriate notification is displayed to the user(s).

When the entered second fingerprint image matches the second reference fingerprint image, the method continues at block 908 where the first user can complete the purchase on the online store. In one embodiment, the purchase can be completed by having a processing device countersign the first online account token associated with the first user and transmit the countersigned online account token to the online store. The countersigned online account token can indicate the purchase has been authorized and the user may complete the purchase on the online store. In one embodiment, a secure processing device can countersign the first online account token associated with the first user with the hash of the DSID associated with the online store and transmit the countersigned first online account token to the online store (step 1002 in FIG. 10).

In another embodiment, the purchase can be completed by having a secure processing device countersign both the first online account token associated with the first user and a second online account token associated with the second user with the hash of the DSID associated with the online store and transmit the countersigned first and second online account tokens to the online store (step 1010 in FIG. 10).

The online store can then transmit the countersigned first online account token, or the countersigned first and second online account tokens, to the online payment service (step 1004). The online payment service can verify the appropriate online account token or tokens is countersigned, complete payment for the purchase, and then transmit a purchase confirmation notification to the online store (step 1006).

Figure 11:
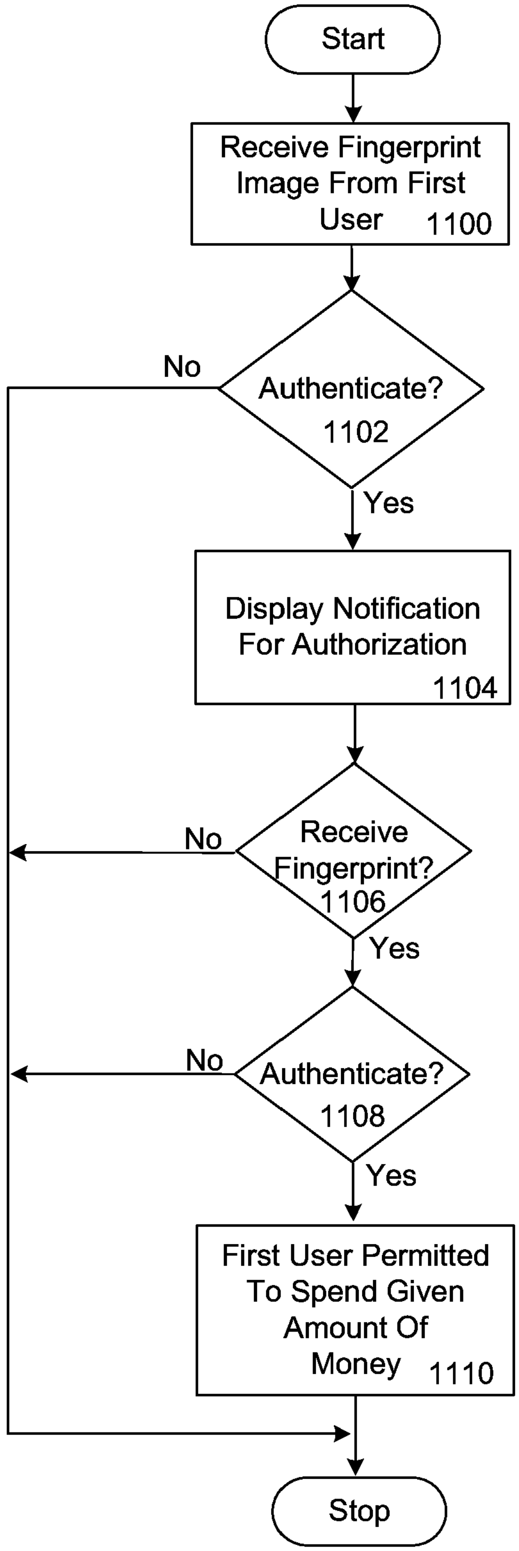
FIG. 11 is a flowchart of a method for a second user to permit a first user to spend a given amount of money.

FIG. 11 is a flowchart of a method for a second user to permit a first user to spend a given amount of money. Initially, a fingerprint image is received from a first user at block 1100. The fingerprint image can be received by a processing device, such as a secure processing device. A determination can then be made at block 1102 as to whether or not the identity of the first user is authenticated based on the fingerprint image. If not, the method ends. When the identity of the first user is authenticated, the method continues at block 1104 where a notification is provided to the second user to obtain authorization from the second user. The notification can be displayed to the second user, or can take the form of a visual or audio alert.

Figure 12:
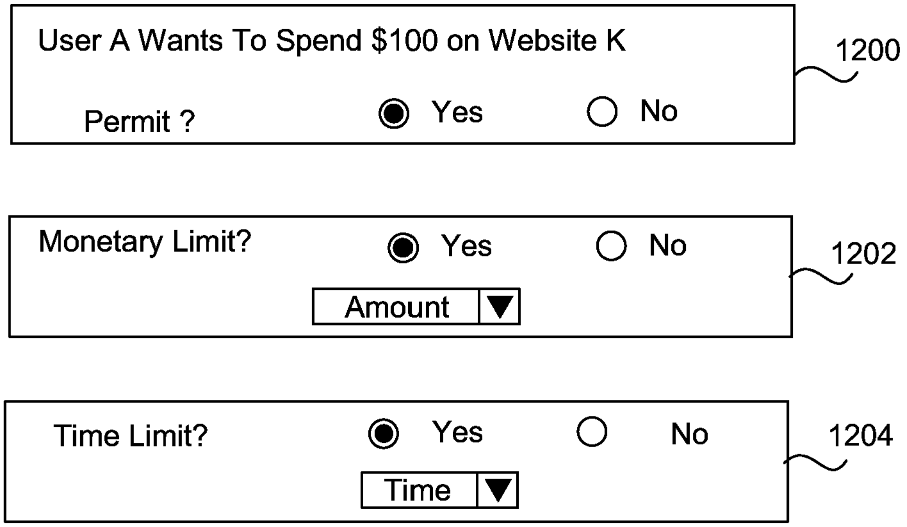
FIG. 12 illustrates an example notification that is suitable for use in block 1104 of FIG. 11.

FIG. 12 illustrates an example notification that can be displayed to the second user. A first window 1200 can inform the second user of the purchase the first user is attempting to complete and request authorization that can allow the first user to complete the purchase. Radio buttons can allow the second user to select "yes" or "no". If the second user selects "yes", a second window 1202 may be displayed that allows the second user to authorize the first user to spend a given amount of money. If the second user wants to provide such authorization, the second user can select the "yes" radio button and specify the amount of money with the drop-down list. Other embodiments can allow the second user to provide authorization differently. For example, the second user can receive a text message and respond with another text message. The response can include the word "yes" or "no" for authorization of the purchase, and if desired, may include a number representing the amount of money the first user is authorized to spend.

In some embodiments, the authorization provided by the second user can also limit the amount of time the first user can spend on the online store or website. A third window 1204 can be displayed that allows the second user to limit or not limit the amount of time using radio buttons. If the second user limits the amount of time, a drop-down menu can allow the user to specify the amount of time. Additionally or alternatively, at least one of the windows 1200, 1202, 1204, or a new window, can notify the second user of the need to submit one or more fingerprints to authorize the purchase.

Returning to block 1106 in FIG. 11, a determination can be made as to whether or not a fingerprint image is received from the second user. In some embodiments, the authorization fails if the fingerprint image is not received within a given time period. If a fingerprint image is not received from the second user, or not received within the given time period, the method can end. When a fingerprint image is received from the second user, the method can continue at block 1108 where a determination is made as to whether or not the identity of the second user is authenticated based on the fingerprint image. If not, the method ends. When the identity of the second user is authenticated, the method continues at block 1110 where the first user is now authorized to spend a specified amount of money. The specified amount of money can be authorized for a single purchase, for a given number of purchases, and/or for a given period of time.

Figure 13:
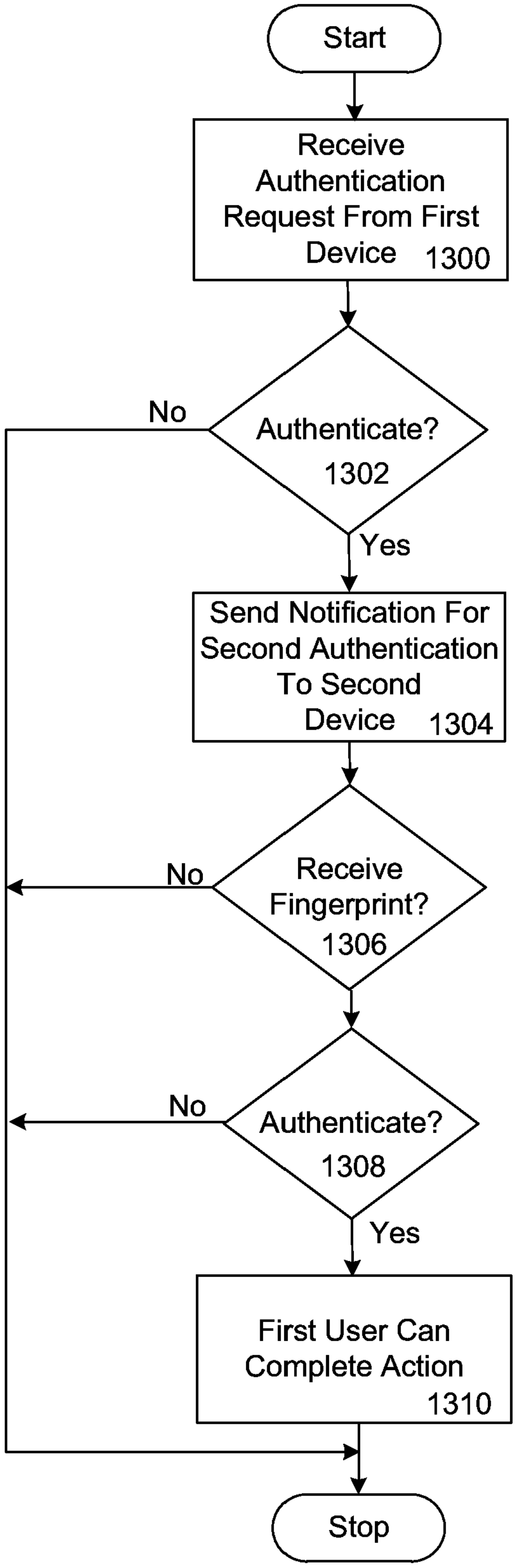
FIG. 13 is a flowchart of a method for obtaining authorization from a second user remotely.

Referring now to FIG. 13, there is shown a flowchart of a method for obtaining authorization from a second user remotely. A website or application can receive an authentication request from a first device at block 1300. For example, a first user may wish to complete a purchase on an online store using a tablet computing device. A determination can then be made at block 1302 as to whether or not the identity of the requestor (e.g., a first user) is authenticated. If not, the method ends.

When authentication of the first user is successful, the process continues at block 1304 where a notification is provided to a second device requesting authorization for the action the first user wishes to complete. For example, a notification can be displayed on the second user's smart telephone. The notification can include a request for the second user to submit his or her fingerprint image. By way of example only, the notification can be configured similar to at least one of the notifications shown in FIG. 12.

A determination can then be made at block 1306 as to whether or not a fingerprint image is received from the second user. The method ends if a fingerprint image is not received. When a fingerprint image is received, the method passes to block 1308 where a determination is made as to whether or not the identity of the second user is authenticated based on the fingerprint image. If not, the method ends. When the authentication is successful, the process continues at block 1310 where the first user can complete the desired action on the first device.

Figure 14:
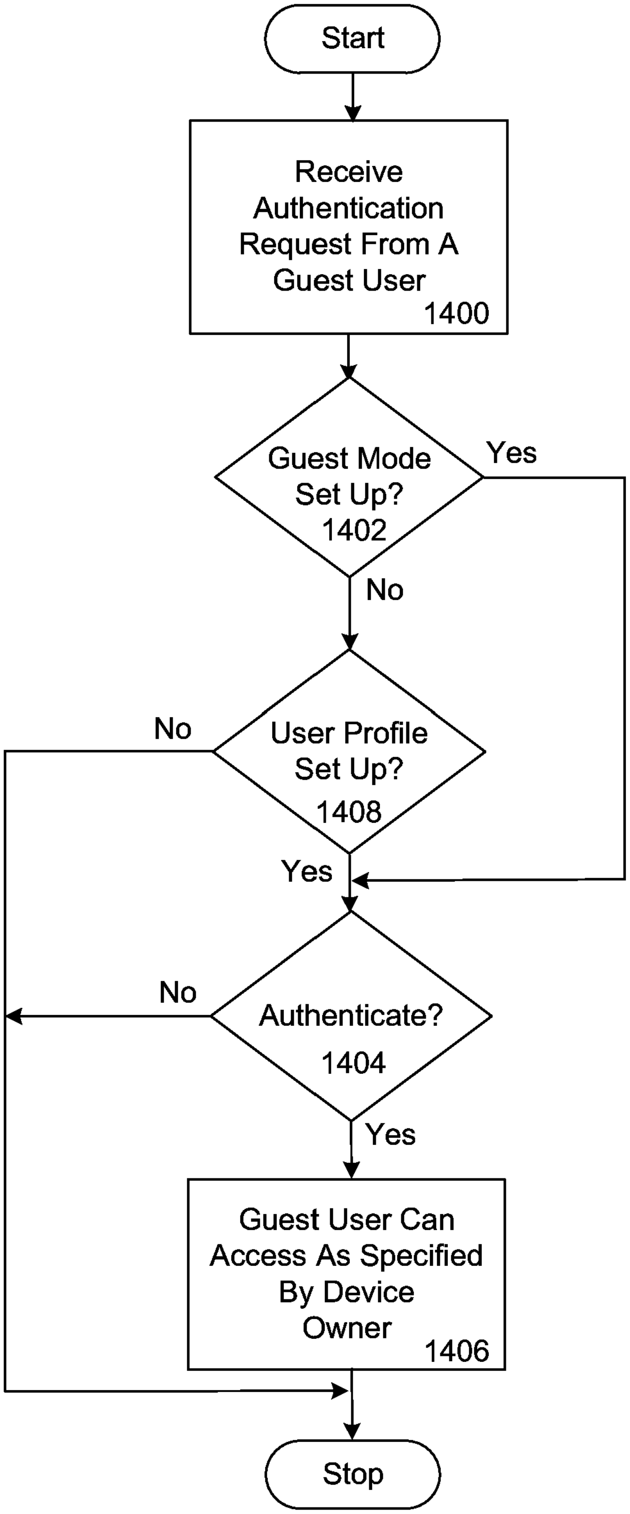
FIG. 14 is a flowchart of a method for permitting a guest or authorized user to access to an electronic device.

FIG. 14 is a flowchart of a method for permitting a guest user to access to an electronic device. The guest user is an enrolled guest user in one embodiment. In other words, the guest user has performed an enrollment process that captures one or more fingerprint images prior to the performance of the method shown in FIG. 14. At least one of the fingerprint images entered during the enrollment process by the guest user can be used as a reference fingerprint image.

Initially, as shown in block 1400, a request for authentication is received from a guest user. As part of the request, the guest user submits his or her fingerprint image. A determination can then be made at block 1402 as to whether or not the owner of the device has enabled a guest mode. Guest mode can permit a guest user to access certain functions and applications when the guest user is temporarily using an electronic device that belongs to another person. For example, a person (i.e., guest user) can ask to use a friend's smart telephone to make a call, send a text, or check a website or email. When the device owner has enabled the guest mode, the guest user can access some, but not all of the functions and applications in the electronic device. A device owner can specify which applications and functions a guest user can access and/or may specify the maximum amount of time the guest user has to use the electronic device.

If guest mode is enabled, the process passes to block 1404 where a determination can be made as to whether or not the identity of the guest user can be authenticated. If not, the method ends. When the identity of the guest user can be authenticated, the method continues at block 1406 where the guest user can access the electronic device as specified by the owner. The method can then end, as shown in FIG. 14.

Returning to block 1402, when the guest mode is not enabled, the process passes to block 1408 where a determination can be made as to whether or not the device owner has created a user profile for the guest user. A user profile is similar to the guest mode, but can allow the guest user to access a greater number of functions and applications, and/or allow a device owner to customize the applications and functions accessible by each guest user. For example, a guest user A may be allowed to send text messages and access the web to view websites, while a guest user B can access the web to view websites and make purchases on online stores, make telephone calls (when the electronic device is a smart telephone), and take photos. The ability to view photos, change Wi-Fi connections, activate airplane mode, set the alarm clock, and read texts and emails can be denied to one or both guest users through respective user profiles.

The method ends if a user profile has not been created. When an owner has created a user profile for the guest user, the method continues at block 1404 where a determination can be made as to whether or not the identity of the guest user can be authenticated. If not, the method ends. When the identity of the guest user can be authenticated, the method continues at block 1406 where the guest user can access the electronic device as specified by the owner.

Figure 15:
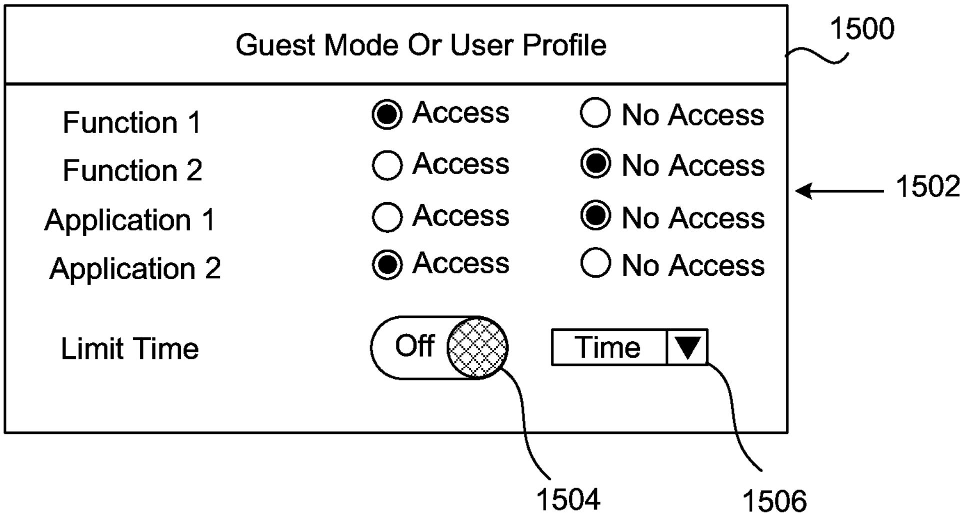
FIG. 15 depicts an example guest or user profile that is suitable for use in blocks 1402 and 1404 of FIG. 14.

An electronic device owner can enable guest mode and/or create a user profile in a variety of ways. In one embodiment, a control panel or menu can be used by a device owner to enable guest mode and/or to create a user profile. FIG. 15 illustrates one example of a menu 1500 that can be used to specify which functions and/or applications a guest user can access and not access. In the illustrated embodiment, radio buttons 1502 allow the device owner to provide access to Function 1 and Application 2 for the guest mode and/or for the user profile, but deny access to Function 2 and Application 1. Additionally, the toggle switch 1504 and drop-down menu 1506 can allow the electronic device owner to limit or specify the amount of time the guest user is allowed to use the electronic device.

A device owner can create a customized user profile for one or more guest users. For example, a device owner can create a user profile for close friends, children, or business associates. Alternatively, an employer can create user profiles that are specific to certain employees.

Additionally or alternatively, a device owner can create a guest mode profile that can be used for multiple guest users. In one embodiment, the guest mode profile can act as a generic user profile that applies to guest users temporarily using an electronic device.

The methods shown in FIGS. 4, 6, 8, 9A-9B, 11, 13, and 14 have been described with reference to a single biometric (fingerprint) image, but those skilled in the art will recognize that other embodiments can use one or more biometric images. In some embodiments, a user can determine a level of security when accessing the online store with an electronic device. For example, a user can require that a sequence of fingerprint images be captured and matched to a sequence of reference fingerprint images before the user can access and/or make purchases on the online store. The user can specify the number of fingerprint images in the sequence, which fingerprints are included in the sequence, and/or the order of the fingerprint images in the sequence. For example, a user can require that two fingerprint images be captured before a setting is changed, and the fingerprints to be scanned along with the order of the scans are the right index finger and the left ring finger.

Additionally, a user can require a password be entered and matched to a reference password. Access to the online store is provided only when a fingerprint image or a sequence of fingerprint images matches respective reference fingerprint images and only after the password matches the reference password.

The embodiments herein have been described with reference to a fingerprint sensing device and fingerprint images. Other embodiments, however, are not limited to a fingerprint sensing device and fingerprint images. Any suitable type of biometric sensing device can be used to detect or acquire images of a biometric attribute.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for a first user to complete a purchase on an online store, the method comprising:

receiving, from the online store over a network, by a secure processing system of an electronic device, an online account token associated with an account of the first user on the online store;

storing the online account token in a non-persistent memory of the secure processing system;

receiving, from the online store over the network, by the secure processing system of the electronic device, user identifier data associated with the first user;

storing the user identifier data in a persistent memory of the secure processing system;

prohibiting a processing device of the electronic device, wherein the processing device is outside the secure processing system, from accessing data stored in the non-persistent memory and data stored in the persistent memory;

prohibiting the online account token from being stored in the persistent memory;

determining, by the processing device of the electronic device, that the purchase requires authorization from a second user;

receiving, in response to a biometric authentication of the second user, authorization to complete the purchase on the online store;

in response to receiving the authorization to complete the purchase on the online store, countersigning, by a secure processing device of the secure processing system, the online account token with the user identifier data associated with the first user, wherein the countersigned online account token indicates the purchase on the online store is complete; and transmitting the countersigned online account token to the online store.

2. The method as in claim 1, further comprising:

prior to countersigning the online account token:

receiving, into the secure processing system, a biometric image associated with the first user; and determining that the biometric image associated with the first user matches a reference biometric image associated with the first user and stored by the secure processing system.

3. The method as in claim 2, further comprising establishing a window of time in which purchases are permitted to be made on the online store, via the electronic device, without having to reenter an additional biometric image.

4. The method as in claim 2, wherein the user identifier data comprises a universally unique identifier that is associated with a biometric sensing device of the electronic device and a directory services identification (DSID) that represents the account of the first user on the online store.

5. The method as in claim 1, prior to receiving authorization to complete the purchase, providing a notification to the second user regarding the purchase on the online store by the first user.

6. The method as in claim 5, wherein the notification comprises at least one of an identity of the online store, a monetary amount of the purchase on the online store, or an identity of a content of the purchase on the online store.

7. The method as in claim 5, wherein the notification permits the second user to limit at least one of an amount of money the first user can spend in the purchase or an amount of time the first user can spend on the online store.

8. The method as in claim 5, wherein:

the electronic device is a first electronic device;

the method further comprises, prior to determining if the purchase requires authorization from the second user, submitting, by the electronic device, the purchase to the online store; and providing the notification to the second user regarding the purchase on the online store by the first user comprises providing the notification to the second user on a second electronic device different from the first electronic device regarding the purchase on the online store by the first user.

9. The method as in claim 1, wherein the user identifier data comprises a universally unique identifier and a directory services identification (DSID) that represents the account of the first user on the online store.

10. The method as in claim 9, wherein the user identifier data further comprises a password that is associated with the account on the online store.

11. The method as in claim 9, wherein the DSID comprises a hash of the DSID.

12. The method as in claim 1, wherein the online account token is prohibited from being stored in the persistent memory.

13. A system, comprising:

a processing device; and a secure processing system comprising a secure memory that is inaccessible to the processing device, the secure memory including a persistent memory and a non-persistent memory and configured to:

receive, from an online store over a network, an online account token associated with an account of a first user on the online store;

store the online account token only in the non-persistent memory, such that the online account token is inaccessible to the processing device and is automatically cleared when the non-persistent memory loses power;

prohibit the online account token from being stored in the persistent memory;

receive, from the online store over the network, user identifier data associated with the first user; and store the user identifier data in the persistent memory, wherein:

the processing device is configured to determine if a purchase on the online store by the first user requires authorization of a second user;

in response to the processing device determining that the purchase on the online store by the first user requires authorization of the second user, the secure processing system is configured to:

receive, in response to a biometric authentication of the second user, authorization to complete the purchase on the online store by the first user; and in response to receiving the authorization, countersign the online account token with the user identifier data associated with the first user; and the countersigned online account token indicates the purchase on the online store is complete.

14. The system as in claim 13, wherein the system further comprises a biometric sensing device configured to:

receive a biometric image from the second user; and provide the biometric image to a secure processing device to perform the biometric authentication of the second user.

15. The system as in claim 14, wherein:

the secure processing system and the biometric sensing device are included in a single electronic device; and the secure processing device is a component of the secure processing system.

16. The system as in claim 14, wherein:

the secure processing system is included in a first electronic device; and the biometric sensing device and the secure processing device are included in a second electronic device.

17. The system as in claim 14, wherein the user identifier data comprises a universally unique identifier that is associated with the biometric sensing device.

18. The system as in claim 17, wherein the user identifier data further comprises a directory services identification (DSID) that represents the account of the first user on the online store.

19. The system as in claim 13, wherein:

the system further comprises a biometric sensing device operatively connected to the secure processing system; and the secure processing system is adapted to receive a biometric image from the first user and countersign the online account token with user identifier data only when the biometric image received from the first user matches a second reference biometric image associated with the first user and stored in the secure memory.

20. The system as in claim 19, wherein the user identifier data comprises a universally unique identifier that is associated with the biometric sensing device.

21. The system as in claim 13, wherein the user identifier data comprises at least one of a directory services identification (DSID) that represents the account of the first user on the online store or a password that is associated with the account of the first user on the online store.

22. The system as in claim 21, wherein the DSID comprises a hash of the DSID.

23. A method for a first user to complete a purchase on an online store, the method comprising:

receiving, from the online store over a network, by a first secure processing system of a first electronic device, an online account token associated with an account of the first user on the online store;

storing the online account token in a non-persistent memory of the first secure processing system;

receiving, from the online store over the network, by the first secure processing system of the first electronic device, user identifier data associated with the first user;

storing the user identifier data in a persistent memory of the first secure processing system;

prohibiting a first processing unit of the first electronic device, wherein the first processing unit is outside the first secure processing system, from accessing data stored in the non-persistent memory and data stored in the persistent memory;

prohibiting the online account token from being stored in the persistent memory;

receiving, at the first secure processing system, a first biometric image associated with the first user;

determining, by the first secure processing system, that the first biometric image matches a reference biometric image stored in the persistent memory;

determining, by the first processing unit of the first electronic device, that the purchase by the first user requires authorization from a second user;

transmitting, by the first processing unit, a notification requesting the second user to authorize the purchase;

receiving an authorization by the second user to complete the purchase in response to a second secure processing system of a second electronic device determining that a second biometric image associated with the second user captured based on the notification matches a second reference fingerprint; and in response to receiving the authorization to complete the purchase, countersigning, by the first secure processing system, the online account token with the user identifier data associated with the first user, wherein the countersigned online account token indicates the purchase on the online store is complete.

24. The method as in claim 23, further comprising transmitting the countersigned online account token to the online store.

25. The method as in claim 23, wherein the notification comprises at least one of the following:

an identity of the online store;

a monetary amount of the purchase on the online store;

an input that permits the second user to limit an amount of money the first user can spend in the purchase; and an input that permits the second user to limit an amount of time the first user can spend on the online store.

26. The method as in claim 23, wherein the notification is transmitted in response to determining that the first biometric image associated with the first user matches the reference biometric image associated with the first user.

* * * * *